United States Patent [19]

Leibowitz et al.

[11] 4,233,339
[45] Nov. 11, 1980

[54] METHOD FOR MAKING ELECTROCHROMIC FILMS HAVING IMPROVED ETCH RESISTANCE

[75] Inventors: Marshall Leibowitz, Ridgefield, Conn.; Richard Crandall; Brian Faughnan, both of Princeton, N.J.

[73] Assignee: Timex Corporation, Waterbury, Conn.

[21] Appl. No.: 953,716

[22] Filed: Oct. 23, 1978

[51] Int. Cl.³ .............................................. G02F 1/01
[52] U.S. Cl. ..................................... 427/108; 29/570; 204/192 P; 350/357; 427/109; 427/126.2; 427/126.3; 427/164; 427/165; 427/166; 427/372.2; 427/377
[58] Field of Search ............... 427/108, 109, 162, 164, 427/126, 377, 165, 166, 372.2; 350/357; 29/570; 204/192 P

[56] References Cited

U.S. PATENT DOCUMENTS

| | | | |
|---|---|---|---|
| 4,006,966 | 2/1977 | Meyers et al. | 350/357 |
| 4,021,100 | 5/1977 | Giglia | 350/357 |
| 4,059,341 | 11/1977 | Zeller | 350/357 |
| 4,068,928 | 1/1978 | Meyers | 350/357 |
| 4,120,568 | 10/1978 | Deb et al. | 350/357 |
| 4,123,841 | 11/1978 | Yano et al. | 350/357 |

FOREIGN PATENT DOCUMENTS 2832203  8/1979  Fed. Rep. of Germany ........... 350/357

OTHER PUBLICATIONS

Green, M. and Richman D., "A Solid State Electrochromic Cell-the RbAg$_4$I$_5$/WO$_3$ System" Thin Solid Films 24 (1974), S45, 46.
"Proceedings of the Fourth Brown Boveri Synposium on Nonemissive Electrooptic Displays", 1975, pp. 175 to 177.
Green, M and K. S. Kang "Solid State Electrochromic Cells-the M-B-Alumina/WO$_3$ System" Thin Solid Films, 40 (1977), L19-L21.

Primary Examiner—John D. Smith
Attorney, Agent, or Firm—Edward J. Timmer

[57] ABSTRACT

Thin, amorphous electrochromic layers deposited on substrate electrodes by, for example, vacuum deposition techniques, are subjected to a special heat treatment at a selected high temperature for a selected short time to convert at least a free portion of each layer to be exposed to the electrolyte from the amorphous form to a crystalline form while preventing excessive water loss which might adversely affect the electrochromic properties of the layer for display purposes. Crystallization of at least the free surface portion of the electrochromic layer significantly increases its etch resistance whereas retention of water in the electrochromic layer maintains satisfactory electrochromic properties for display purposes.

9 Claims, 3 Drawing Figures

METHOD FOR MAKING ELECTROCHROMIC FILMS HAVING IMPROVED ETCH RESISTANCE

FIELD OF THE INVENTION

The present invention relates to electrochromic materials and to electrooptical displays which utilize such materials. More particularly, the present invention provides means in the form of a heat treatment for improving the etch resistance of electrochromic films or layers during operation of electrochromic displays, thereby increasing the useful life of such displays. The invention further relates to the incorporation of the heat treatment in the manufacture of electrochromic displays.

DESCRIPTION OF THE PRIOR ART

Thin, amorphous films of electrochromic materials, such as $WO_3$, form the basis for a passive electrochromic display device in which the film is changed from transparent to a blue color by application of a negative electrical potential thereto. Typically, an electrochromic display comprises a first transparent substrate with selectively actuable transparent electrodes and first image-forming electrochromic layers thereon, a second spaced substrate with a counter-electrode and second electrochromic layer thereon and an ion-conducting or electrolyte layer between the substrates. Constructions of electrochromic displays are shown in U.S. Pat. Nos. 3,944,333 to Leibowitz issued Mar. 16, 1976; 4,006,966 to Meyers et al issued Feb. 8, 1977; 4,059,341 to Zeller issued Nov. 22, 1977; 4,060,311 to Green issued Nov. 29, 1977; 4,068,928 to Meyers et al issued Jan. 17, 1978 and 4,073,570 to Korinek issued Feb. 14, 1978 among others.

Many electrochromic materials exist which change color according to oxidation state. These are well known in the art and are disclosed in part in the patents cited above. In the process of changing color, the electrochromic material passes through various intermediate valence or oxidation states where it can exist at non-stoichiometric compounds. For example, tungsten trioxide ($WO_3$) passes through various non-stoichiometric valence states of tungsten oxide (also known as hydrogen tungsten oxide) and may approach a state very close to tungsten pentoxide. However, since particular oxidation states of the electrochromic material are soluble in the electrolyte of the display, the material suffers degradation with operating time and temperature, causing an adverse effect on the quality of the image produced and thus the service life of the display. This degradation is sometimes referred to as etching of the electrochromic layer. Although electrochromic displays exhibit highly useful display properties, such as excellent contrast and viewability from various angles, their usefulness has been somewhat limited as a result of the aforementioned degradation of the electrochromic layers with operating time and temperature. Attempts by prior art workers to alleviate this problem are exemplified in U.S. Pat. Nos. 3,970,365 to Giglia issued July 20, 1976; 3,957,352 to Leibowitz issued May 18, 1976; 4,012,831, to Leibowitz issued Mar. 22, 1977, the latter two of which teach that a reduction in degradation of the electrochromic layers can be achieved by adding certain components to the electrolyte with which the layers are in contact.

SUMMARY OF THE INVENTION

An object of the present invention is to reduce degradation of electrochromic layers in an electrochromic display by a heat treatment which imparts increased etch resistance to the layers.

Another object of the invention is to impart said improved etch resistance to the layers without substantially harming the electrochromic properties thereof for display purposes.

In manufacturing electrooptical displays of the electrochromic type, it is common to deposit the electrochromic layers on the substrate electrodes by vacuum deposition techniques, such as sputtering, thermal vapor deposition as well as others. Generally, the as-deposited electrochromic layers are thin, for example, from 0.1 to 1 micron in thickness, and are amorphous. Through research related to the present invention, the as-deposited electrochromic layers have been found to contain a relatively large percentage of water, classified as so-called surface water and bonded water, which seems to be necessary for development of satisfactory electrochromic properties in the layers under applied negative electric potentials. By surface water, we mean water than can be driven off at temperatures less than about 100° C. whereas bonded water requires significantly higher temperatures in the area of 250°–275° C. for removal. The present invention relates to the further discovery that the resistance to dissolution or etching of the as-deposited electrochromic layers, although dependent to some extent upon the electrolyte environment with which the layers are in contact in the display, can be considerably improved while retaining satisfactory electrochromic properties for display purposes by heat treating each layer at a selected high temperature for a selected short time to convert at least a free surface portion thereof from the amorphous form to the crystalline form while preventing excessive water loss which might adversely affect the electrochromic properties. In the present invention, the temperature of the heat treatment generally is selected to be equal to or above the crystallization temperature determined for the particular electrochromic material whereas the time of heat treatment is selected as sufficient to assure crystallization through the desired portion of the electrochromic layer but insufficient to produce deleterious water loss from the layer. In general, the heat treatment temperature and time are selected in inverse relation to one another. When exposed to typical electrochromic display electrolytes under typical applied potentials, an electrochromic layer of the invention having at least a crystallized free surface portion in contact with the electrolyte is observed to be significantly more etch resistant than an as-deposited electrochromic layer having an amorphous free surface in contact with the electrolyte.

Of course, as a result of the increased etch resistance of the electrochromic layer of the invention, displays incorporating such layers will exhibit a substantially increased service life while exhibiting many of the benefits and advantages of electrochromic displays.

BRIEF DESCRIPTION OF THE DRAWINGS

Other objects and advantages of the invention may be seen from the following description when viewed in conjunction with the accompanying drawings wherein.

DETAILED DESCRIPTION OF THE INVENTION

Figure 1:
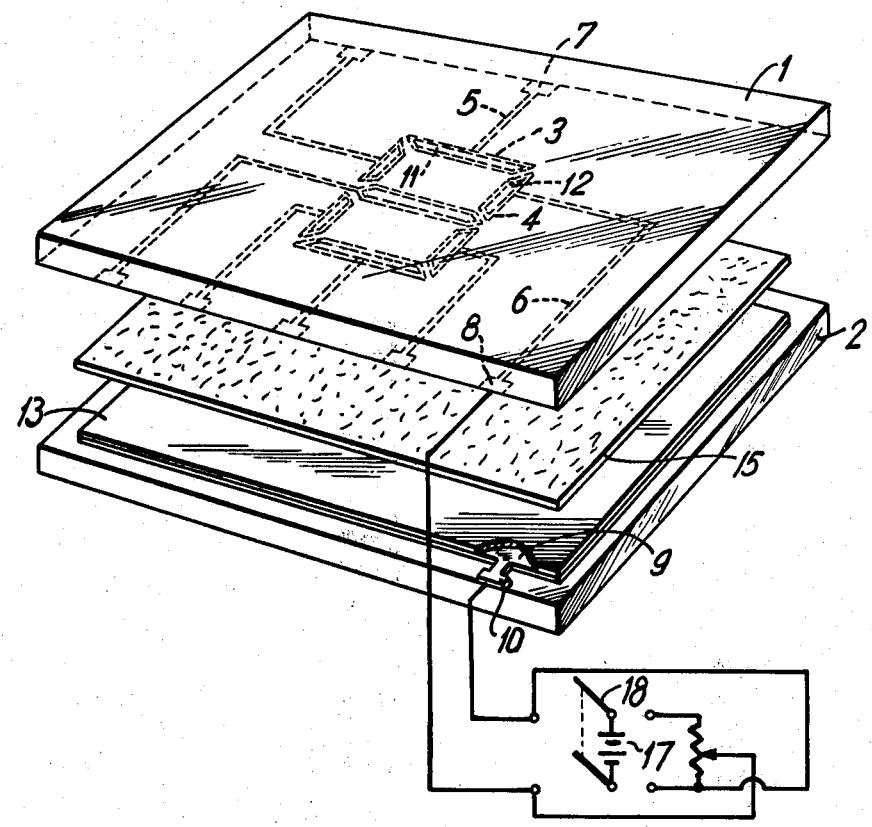
FIG. 1 is an exploded perspective view of an electrochromic display embodying the invention.

Referring now to FIG. 1 of the drawings, the electrochromic display is a sandwich construction of a first transparent substrate 1 and a second spaced substrate 2, which need not be transparent, and electrolyte layer 15 therebetween. Substrate 1 has a conductive pattern of transparent electrodes on the underside thereof such as segments 3,4 of a pattern which can be selectively actuated to form digits or other optical patterns via conductive leads 5,6 leading to terminals 7,8. Substrate 1 may be of transparent glass or plastic with a selected pattern of transparent electrodes 3,4 thereon of a material such as, for example, tin oxide. The pattern may be etched on the substrate by using a commercially available material known as NESA glass and removing the conductive coating except for electrodes 3,4.

The second substrate has a conductive back electrode 9 thereon. Substrate 2 may be made of glass, ceramic or plastic coated with a suitable conductive layer to form back electrode 9 connected to terminal 10. Coated on the transparent electrode segments 3,4 and also on back electrode 9, if desired, are layers of electrochromic material indicated as 11, 12, 13. The electrochromic layers 11, 12, on segments 3,4 respectively are applied by suitable masking techniques to cover a smaller area than the electrodes so as to give good edge definition.

Electrolyte layer 15 may take various forms including, but not limited to, liquid electrolytes, gelled electrolytes, paste electrolytes, ion-conducting solids and ion-exchange resins. These and other types of electrolytes are generally well known in the art; for example, see U.S. Pat. Nos. 3,521,941 to Kumar et al; 3,827,784 to Giglia et al; 3,840,287 to Witzke et al; 3,995,943 to Jasinski; 4,009,936 to Kasia and 4,012,831 to Leibowitz. A preferred electrolyte comprises a solid membrane of a soluble polymer cationic ion exchange resin in acid form and chemically wetted, such as soluble polystyrene sulfonic acid polymer cationic exchange resin chemically wetted with water, more fully described in copending Leibowitz patent application U.S. Ser. No. 791,536 entitled "Electrochromic Device With Cationic Exchange Resin Separator" filed Apr. 27, 1977. In some situations, a porous separator sheet (not shown) may be utilized as a carrier for the electrolyte, for example, as shown in the Leibowitz patent, U.S. Pat. No. 3,944,333, also of common assignee herewith.

Figure 2:
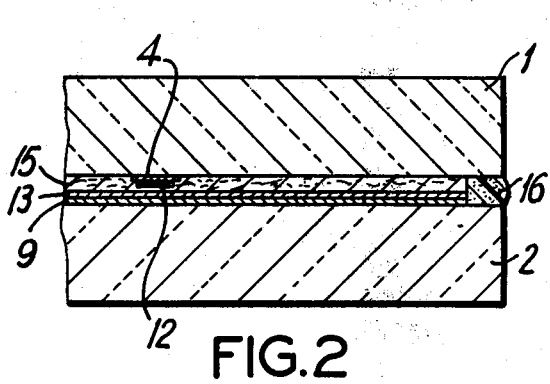
FIG. 2 is an enlarged cross-sectional view of the invention taken through an assembled display according to FIG. 1.

Reference to FIG. 2 shows the assembled display. The two substrates 1 and 2 are attached to one another by an adhesive 16, such as epoxy, and the electrolyte layer is incorporated into the display in conventional manner. Then the substrates are sealed with adhesive around the remaining sides. Suitable well-known means for actuating the display element includes means for applying an electric field from a battery 17 to a selected segment 4 via terminal 8 and the back electrode 9 via terminal 10. Means for reversing the polarity of the applied voltage to erase the image is indicated symbolically by a two-pole double throw switch 18.

Figure 3:
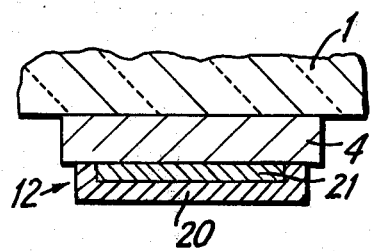
FIG. 3 is a further enlarged cross-sectional view of the electrochromic layer of FIG. 2.

As mentioned hereinbefore, electrochromic layers 11, 12 are formed on substrate electrodes 3,4 generally by vacuum deposition techniques, although others such as chemical vapor deposition and spraying may sometimes be utilized. Thermal vapor deposition and sputtering are exemplary of useful vacuum deposition techniques. In accordance with one embodiment of the present invention, the resistance to dissolution or etching of the thin amorphous as-deposited electrochromic layers is significantly improved by subjecting each such layer to a heat treatment at a selected high temperature at or above the crystallization temperature of the particular electrochromic material employed for a selected short time to convert at least a free surface portion of each layer which will ultimately be exposed to electrolyte layer 15 from the amorphous state to a crystalline state while preventing excessive loss of water which loss might adversely affect the electrochromic properties for display purposes. Generally, if some of the so-called surface water is driven off during the heat treatment, it will normally be replenished when the electrochromic layers are brought in contact with the electrolyte during final assembly. FIG. 3 illustrates electrochromic layer 12 after subjection to this type of heat treatment wherein it is evident that a free surface case 20 of crystalline structure is formed through the layer to a selected depth and more or less encloses the amorphous portion 21 of the layer and separates it from actual contact with the electrolyte layer 15. In general, it will be apparent to those skilled in the art that the temperature of the heat treatment and the duration thereof will depend upon the type of electrochromic material being treated, the thickness of the electrochromic layer, the water content of the layer, the amount of crystallization thickness required through the layer and the atmosphere maintained in the heating chamber. Usually, the temperature and time will be varied in inverse relation to one another. By way of example, amorphous layers of $WO_3$ (tungsten trioxide) deposited on tin oxide electrodes by vacuum deposition technique to a thickness of 0.30 microns have been heat treated at 525° C. for 1 minute in air with satisfactory results in terms of providing considerably enhanced etch resistance to electrolytes, such as a 10% by volume $H_2SO_4$ solution, a chemically wetted soluble polystyrene sulfonic acid polymer cationic exchange resin and phosphoric acid, while retaining sufficient water in the layer (i.e. reducing excessive water loss during the heat treatment) to provide acceptable coloring and bleaching rates for display purposes. For example, etch resistance was measured by exposure of the treated electrochromic layer to a dilute base solution (Ph 10) and recording the time for dissolution. It was found that the electrochromic layer treated at 525° C. for 1 minute exhibited a degradation time of 10 minutes whereas an amorphous layer exhibited a degradation time of less than 30 seconds. Coloring rate was determined by measuring the time required to inject 5mC/CM of charge in a layer with an indium wire dipped in a 10% by volume $H_2SO_4$ solution which rests on the free surface of the $WO_3$ film. An external wire was connected to the indium wire through a charge integrator and then to the electrode upon which the $WO_3$ film was deposited. The $WO_3$ layer heat treated at 525° C. for 1 minute colored in 3 seconds under these conditions whereas an amorphous film colored in 2 seconds.

Typically, for amorphous $WO_3$ layers, the crystallization temperature has been determined to be about 265° C. Thus, according to the invention, the temperature of the heat treatment is selected at or above this value to insure that crystallization takes place. The time, as already mentioned, is selected in relation to the temperature such that crystallization occurs to the desired thickness without causing a harmful loss in water from the as-deposited layer. Generally, for WO₃ layers heat treated in a conventional tube furnace having an air atmosphere, times from about ½ to 15 minutes are satisfactory. Times of about 1 to 2 minutes are preferred when the temperature is at least about 500° C. Of course, if steam or water bearing gas is introduced into the furnace to inhibit moisture removal from the layer during crystallization, the time of the heat treatment may be extended, or possibly higher temperatures utilized. Of course, the temperature-time parameters for electrochromic materials other than WO₃ can be readily determined by those skilled in the art with accepted heat treatment techniques. Tungsten trioxide, molybdenum trioxide and admixtures thereof are preferred electrochromic materials for use in the invention, however.

Although the invention has been described thus far with respect to the formation of a crystallized case 20 on the amorphous electrochromic layer, it is considered within the scope of the invention to crystallize the layer through its entire thickness so long as water loss from the layer is minimized as described hereinabove. Crystallization through the entire electrochromic layer thickness may be the end result after subjection to the inventive heat treatment described herein although this has not yet been verified. Nevertheless, the important feature of the invention is to convert at least the free surface portion of the electrochromic layer to be in contact with the electrolyte from the amorphous to the crystallized form with said minimized water loss.

While the invention has been explained by a detailed description of certain specific embodiments, it is understood that various modifications and substitutions can be made in them within the scope of the appended claims which are intended to include equivalents of such embodiments.

We claim:

1. A method for improving the resistance of electrochromic material to the degrading effects, such as etching, resulting from contact with electrolyte means associated with electrochromic displays, comprising the steps of:
    (a) forming an amorphous, water-bearing film of electrochromic material of selected thickness, said film having electrochromic properties suitable for display purposes but having a free surface susceptible to etching by said electrolyte means;
    (b) subjecting the film to a heat treatment at a selected high temperature at least equivalent to the crystallization temperature of said electrochromic material for a selected short time of sufficient duration so as to cause crystallization through at least the free surface portion of the film thickness but of insufficient duration to cause substantial loss of water from said film, whereby crystallization of at least said free surface portion substantially increases resistance of the film to etching while retention of water in the film preserves the electrochromic properties for display purposes.

2. The method of claim 1 wherein the amorphous, water-bearing film is formed by vacuum deposition techniques.

3. The method of claim 1 wherein the film of electrochromic material is selected from tungsten trioxide, molybdenum trioxide or admixtures thereof.

4. The method of claim 3 wherein the electrochromic material is tungsten trioxide and temperature of the heat treatment is at least 265° C. and the time is from about 0.5 to 15 minutes.

5. The method of claim 4 wherein the time is from about 1 to 2 minutes at a temperature of at least 500° C.

6. A method for making an electrochromic display having electrochromic material with improved resistance to the degrading effects, such as etching, resulting from the contact with electrolyte associated with electrochromic displays, comprising the steps of:
    (a) providing a first substrate having transparent electrodes thereon;
    (b) depositing a thin amorphous, water-bearing film of electrochromic material upon each electrode and subjecting each film to a heat treatment at a selected high temperature at least equivalent to the crystallization temperature of the electrochromic material for a selected short time of sufficient duration so as to cause crystallization through at least the free surface portion of the film but of insufficient duration to cause substantial loss of water therefrom;
    (c) providing a second substrate having a counter electrode, the first and second substrates being positioned in spaced working relation;
    (d) filling the space between the substrates with electrolyte; and
    (e) sealing the first and second substrates together with adhesive means, whereby crystallization of at least said free surface portion of each electrochromic film in step (b) substantially increases resistance of the film to etching by said electrolyte, thereby increasing the useful life of said electrochromic display, while retention of water in said films preserves the electrochromic properties thereof for display purposes.

7. The method of claim 6 wherein the film of electrochromic material is deposited upon each transparent electrode by vacuum deposition techniques.

8. The method of claim 6 wherein the film of electrochromic material is selected from tungsten trioxide, molybdenum trioxide or admixtures thereof.

9. The method of claim 8 wherein the electrochromic material is tungsten trioxide and the temperature of the heat treatment is at least 265° C. and the time is from about 0.5 to 15 minutes.

* * * * *

UNITED STATES PATENT AND TRADEMARK OFFICE
CERTIFICATE OF CORRECTION

PATENT NO. : 4,233,339
DATED : November 11, 1980
INVENTOR(S) : Marshall Leibowitz/Richard Crandall/Brian Faughnan It is certified that error appears in the above-identified patent and that said Letters Patent are hereby corrected as shown below:

First page: box [73] Assignee: after "Timex Corporation, Waterbury, Connecticut, insert -- and RCA Corporation, a part interest each --

Signed and Sealed this

Tenth Day of March 1981

[SEAL]

*Attest:*

RENE D. TEGTMEYER

*Attesting Officer*  *Acting Commissioner of Patents and Trademarks*